United States Patent [19]

Arnold et al.

[11] Patent Number: 5,464,083
[45] Date of Patent: Nov. 7, 1995

[54] TORQUE LIMITING SPRING HINGE

[75] Inventors: Joseph E. Arnold, Linsdtrom; David A. Wahlstedt, Minneapolis, both of Minn.

[73] Assignee: Reell Precision Manufacturing Corporation, St. Paul, Minn.

[21] Appl. No.: 114,668

[22] Filed: Aug. 31, 1993

[51] Int. Cl.$^6$ ............................. E05F 5/00; E05D 11/08; E05C 19/02
[52] U.S. Cl. ............................. 192/8 C; 16/337; 16/342; 192/7; 464/40
[58] Field of Search ............................. 16/342, 319, 337, 16/277, 303, 304, 305, 306, 307, 329, 330, 284, 308; 192/8 C, 56 C, 7, 81 C, 12 BA, 17 D; 188/77 W; 464/40

[56] References Cited

U.S. PATENT DOCUMENTS

| | | | |
|---|---|---|---|
| 1,876,654 | 9/1932 | Floraday | 192/8 C |
| 1,954,620 | 4/1934 | Connell | 192/56 C X |
| 2,510,644 | 6/1950 | McCormick | 464/40 X |
| 2,533,973 | 12/1950 | Starkey | 464/40 |
| 2,595,454 | 5/1952 | Greenlee | 464/40 |
| 3,242,696 | 10/1963 | Kaplan . | |
| 3,395,553 | 8/1968 | Stout | 464/40 |
| 3,405,791 | 8/1966 | Kaplan . | |
| 3,405,929 | 3/1967 | Kaplan . | |
| 3,450,365 | 5/1967 | Kaplan . | |
| 3,800,922 | 4/1974 | Kreissler | 192/8 C X |
| 4,115,918 | 9/1978 | Anderl et al. . | |
| 4,189,039 | 2/1980 | Johnson . | |
| 4,433,765 | 2/1984 | Rude et al. . | |
| 4,560,050 | 12/1985 | deMay, II . | |
| 4,651,856 | 3/1987 | Skrobisch . | |
| 4,869,357 | 9/1989 | Batchelder . | |
| 4,995,579 | 2/1991 | Kitamura | 16/337 X |
| 5,010,983 | 4/1991 | Kitamura . | |
| 5,028,913 | 7/1991 | Kitamura . | |
| 5,058,720 | 10/1991 | Rude et al. . | |
| 5,064,137 | 11/1991 | Komatsu . | |
| 5,142,738 | 9/1992 | Ojima | 16/306 |
| 5,157,826 | 10/1992 | Porter et al. . | |
| 5,200,913 | 4/1993 | Kawkins et al. . | |

OTHER PUBLICATIONS

Brochure entitled: Custom designed slip device concept/application; Reel Precision Manufacturing Corporation; (1 pg).
Brochure entitled: Model CTA Constant Torque Hinge; Reell Precision Manufacturing Corporation; (1 pg–2 sided).
Brochure entitled: Model CTB Constant Torque Hinge; Reell Precision Manufacturing Corporation; (1 pg–2 sided).
Brochure entitled: Model CTC Constant Torque Hinge; Reell Precision Manufacturing Corporation; (1 pg–2 sided).
Brochure entitled: Model CTD Constant Torque Hinge; Reell Precision Manufacturing Corporation; (1 pg–2 sided).
Reell Product Catalog; Reell Precision Manufacturing Corporation; published Feb. 1992; (17 pgs.).

*Primary Examiner*—Rodney H. Bonck
*Attorney, Agent, or Firm*—Merchant, Gould, Smith, Edell, Welter & Schmidt

[57] ABSTRACT

A spring hinge and method of making same are disclosed. The spring hinge has a housing enclosing the spring and its associated shaft. The housing includes projections adjacent the ends of the spring such that upon rotation of the spring in either direction, an end of the spring is engaged by the housing and the spring is caused to expand into the "wrap open" condition.

25 Claims, 6 Drawing Sheets

TORQUE LIMITING SPRING HINGE

BACKGROUND OF THE INVENTION

The present invention relates to a spring hinge and method of making same.

Spring hinges have been designed to support an object at various angular positions relative to a main body. For example, spring hinges have been used to support a laptop computer display relative to the base of the computer. An example of prior art spring hinges are applicant's spring wrap hinge models CTA, CTB, CTC, & CTD. These hinges provide torques typically of 4 to 6 pound inches and are ideal for applications requiring relatively high torques in small packages.

In some applications, such as covers for computers, it is desirable to have the spring hinge provide fairly constant torque or resistance to movement throughout its range of motion. In an effort to provide more constant torque there is often more spring back introduced into the operation of the spring hinge, which is the tendency of the spring wrap hinge to rotate back after applied force is removed. One of the causes of spring back are the tangentially extending spring toes or extensions at the ends of the spring. The spring toes or extensions are used to engage a stationary support structure, which supports the shaft/spring combination, as the central shaft/spring combination is initially rotated so as to cause the spring to expand or open up, "wrap open", thereby loosening its grip on the shaft and allowing the shaft to be rotated relative to the spring upon application of a specified torque or force. Using heavier spring wire would result in lower springback but would also result in less constant torque.

Another problem with spring hinges is that their operative life is often not as long as desired. For example, the grease typically present in a hinge can work itself out of the hinge whereby the hinge parts wear out. Additionally, the spring toes or extensions can break off due to fatigue.

A somewhat related problem of spring hinges is that they are susceptible to rusting as the springs of most spring hinges are not enclosed and are exposed to the elements. Typically, the spring material itself is susceptible to rusting. When exposed to the elements for an extended period of use, the spring will most likely begin to rust which will impact its performance.

The present invention solves these and other problems associated with the prior art.

SUMMARY OF THE INVENTION

The present invention relates to a spring hinge and method of making same wherein the spring of the spring hinge has no toes or extensions extending away from the spring.

One embodiment of the present invention relates to a spring hinge wherein the spring is disposed on a shaft within a housing encircling the periphery of the spring so as to enclose the spring coils.

In one embodiment of the present invention, the spring is coaxially mounted on a shaft which is rotatably supported by the housing. The spring's inside coil diameter in its free state is less than the outside diameter of the shaft so that the spring grips the shaft when coaxially disposed on the shaft. The housing encircling the periphery of the spring has projections adjacent both ends of the spring for engaging one end of the spring or the other as the shaft is rotated in either direction, whereby the spring is caused to expand in diameter or "wrap open" whereby the spring exerts less pressure on the shaft, but substantially constant resistance to rotation of the shaft relative to the spring.

In one embodiment, the shaft which is rotatably supported by the housing has an extension attachment end projecting from the housing. The extension attachment end is configured for a press fit with a suitable hinge extension.

These and various other advantages and features of novelty which characterize the invention are pointed out with particularity in the claims annexed hereto and forming a part hereof. However, for a better understanding of the invention, its advantages and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings wherein like reference numerals generally indicate corresponding parts throughout the several views.

DETAILED DESCRIPTION OF A PREFERRED EMBODIMENT

Figure 1:
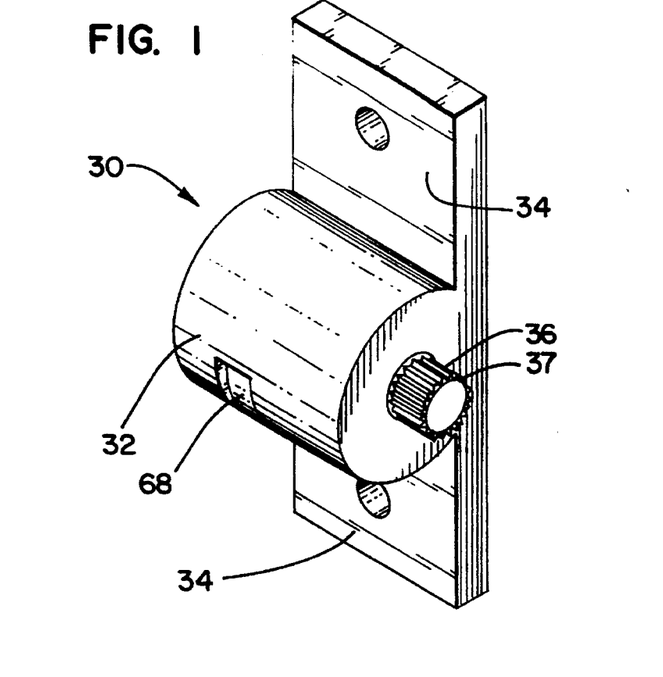
FIG. 1 is a perspective view of an embodiment of a spring hinge in accordance with the principles of the present invention.
Figure 5:
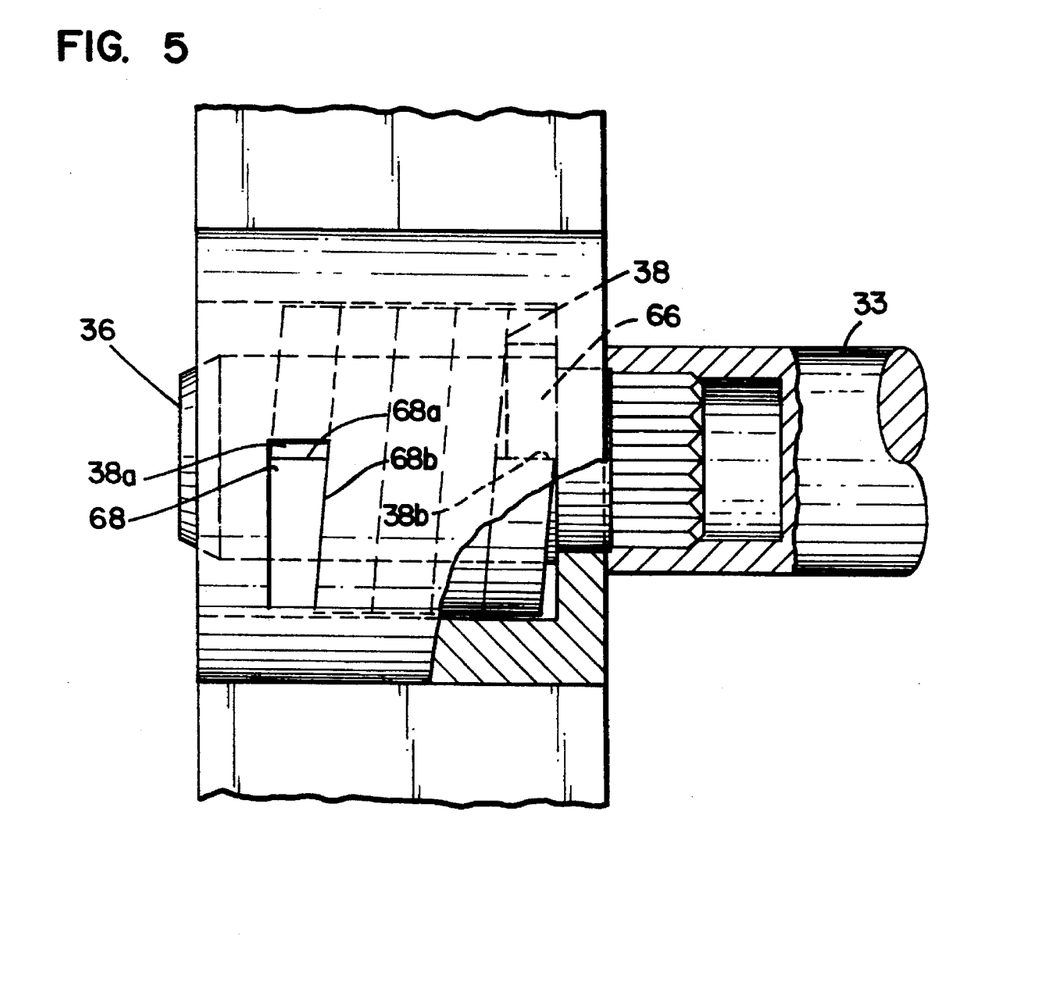
FIG. 5 is a partial sectional view of the spring hinge shown in FIG. 4.

Referring now to the drawings there is shown in FIG. 1 an embodiment of a spring hinge in accordance with the principles of the present invention, the spring hinge being generally referred to by the reference numeral 30. As shown in FIG. 1, the spring hinge includes a housing 32 having integrally extending brackets 34 for mounting the spring hinge 30 to a base structure. A shaft 36 is rotatably supported within the housing. As shown in FIG. 5, a spring 38 is concentrically disposed about the shaft 36 in an interference fit. The shaft 36 extends through an opening in one end of the housing 32 so as to provide a shaft extension attachment end 37 for the attachment of a suitable shaft extension (not shown in FIG. 1). The shaft extension, in turn, is suitably attached to an object or device so as to allow angular adjustment of the device relative to the base structure.

Figure 2:
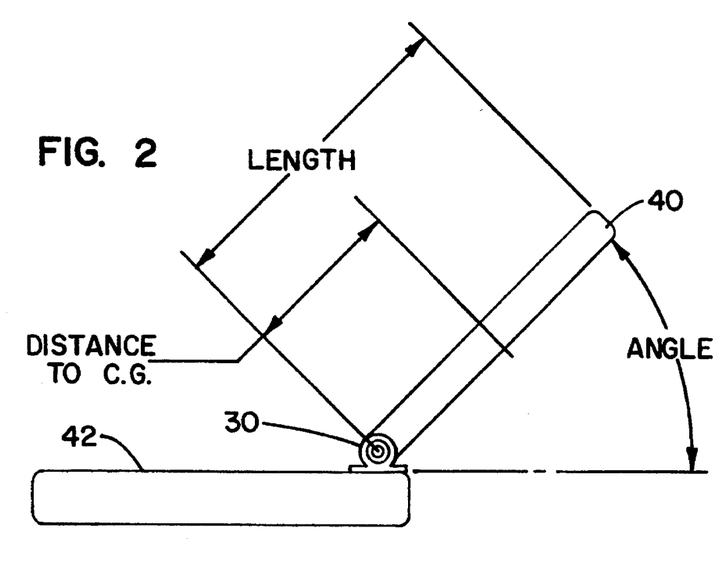
FIG. 2 is a diagrammatic view illustrating use of a spring hinge in the operation of a hinged member relative to a main housing structure.

As illustrated in FIG. 2, one example of where the spring hinge 30 might be used is as a hinge for angular adjustment of a display unit 40 of a laptop or other portable computer 42. Of course it will be appreciated that the spring hinge of the present invention has numerous other applications, including but not limited to office equipment, medical cabinets, computer peripherals, access panels, industrial enclosures, equipment guards, etc.

Use as a hinge is but one application of the present invention. For example, the present invention might be used in a clutch mechanism to cushion or lesson the jarring effects of high acceleration. Another application of the present invention might be as a torque limiting device for limiting the total torque which can be applied to an object so as to prevent damage due to excessive torque being applied.

The present invention has particular application where a substantially constant torque hinge exhibiting a relatively high torque is required in a relatively small package. Various embodiments of the present invention might provide torques of 2 through 12 pound inches although other torques might also be provided. Typically, it is desired that the spring hinge will support the device in whatever angular position it is placed. The formula for determining torque required to support a device is: Torque=Weight×Distance to Center of Gravity (CG)×Cosine (Angle). If the weight is evenly distributed, Distance to CG=Length/2. The Angle is typically considered to be zero as this represents the maximum torque required to support the device. In FIG. 2, the Angle, the Length, and the Distance to CG are diagrammatically illustrated.

The desired torque can be achieved by selecting a spring hinge with the desired torque or by utilizing more than one of the spring hinges. Typically the torque is determined by the characteristics and configuration of the spring coils; e.g., the size and configuration of the wire and the interference of the spring with the shaft. Multiple springs in the same hinge will provide proportionally higher torque. Multiple springs increase the length of the hinge without increasing the diameter. Alternatively, larger wire can be used in a single spring thereby increasing the diameter significantly while affecting the length very little. Above a certain number of wraps or coils, the torque is substantially constant for a given spring configuration and arrangement. Obviously, multiple spring hinges can be used to increase torque. For example a torque of eight pound inches can be obtained by using two spring hinges each having a torque of four pound inches.

With a shaft rotation of 360 degrees, the preferred embodiment provides an infinite number of hinged positions. Moreover, the preferred embodiment provides substantially constant torque over the range of movement and during its normal operational life.

The present invention includes a heavy wrap spring disposed about a shaft so as to provide an interference fit. As the hinge is operated, opened or closed, the spring is engaged by the housing 32 and made to expand about the shaft until the proper torque is reached, at which time the shaft slips inside the spring. Typical friction devices depend on constant coefficient of friction to maintain constant torque. Wrap open spring hinges, of which the present invention is one, depend primarily on spring uniformity.

Figure 3:
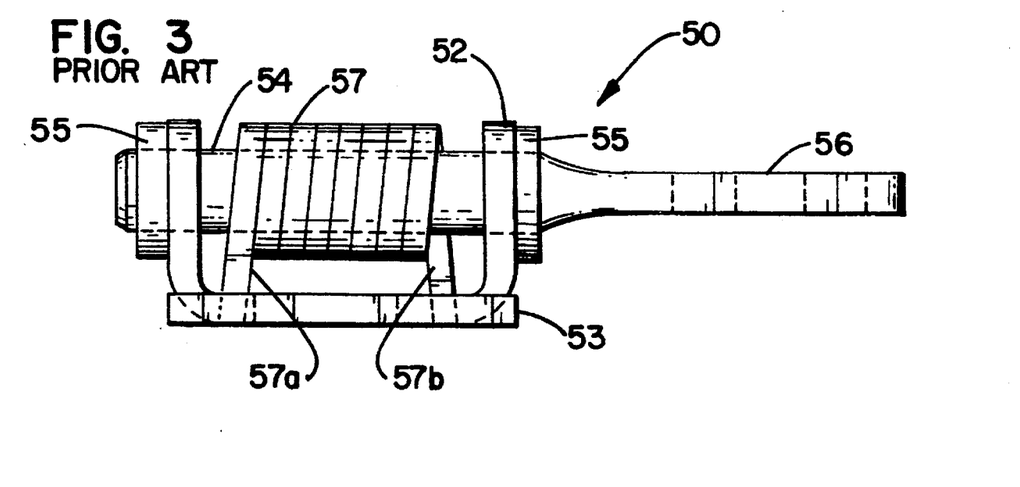
FIG. 3 is a side elevational view of an embodiment of a prior art spring hinge.

Illustrated in FIG. 3 is a prior art spring hinge 50 of applicant's. As illustrated, the spring hinge 50 includes a support bracket 52 and a mounting bracket 53 integral therewith for attachment to a base structure. A shaft 54 is rotatably supported by the bracket 52. Retaining rings 55 are disposed proximate opposite ends of the shaft 54 so as to prevent relative axial movement of the shaft 54 with respect to the support bracket 52. The shaft 54 includes a shaft extension 56 for attachment to a device to be angularly adjusted relative to the base structure. A wrap spring 57 is concentrically disposed on the shaft 54 in an interference fit. The spring 57 has toes or tangential extensions 57a and 57b which engage the bracket 53 when the shaft 54 is rotated. Accordingly as the hinge is operated, opened or closed, one of the extensions 57a,b will engage the bracket 53 so as to expand the spring until a predetermined torque is reached wherein the shaft 54 slips within the spring. This spring hinge is said to "wrap open" in both rotational directions. That is, one of the spring extensions will engage the bracket 53 when the shaft 54 is rotated in a first direction and the other of the spring extensions will engage the bracket 53 when the shaft 54 is rotated in the opposite direction.

Figure 4:
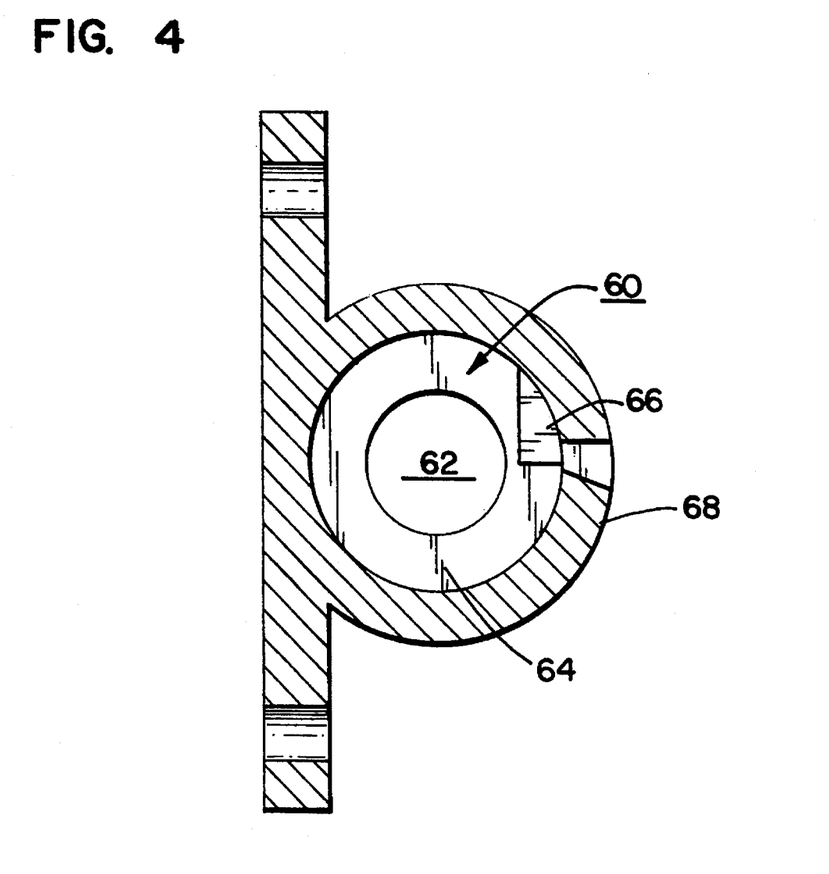
FIG. 4 is an end sectional view of the spring hinge housing shown in FIG. 1 with the spring and shaft removed.
Figure 6:
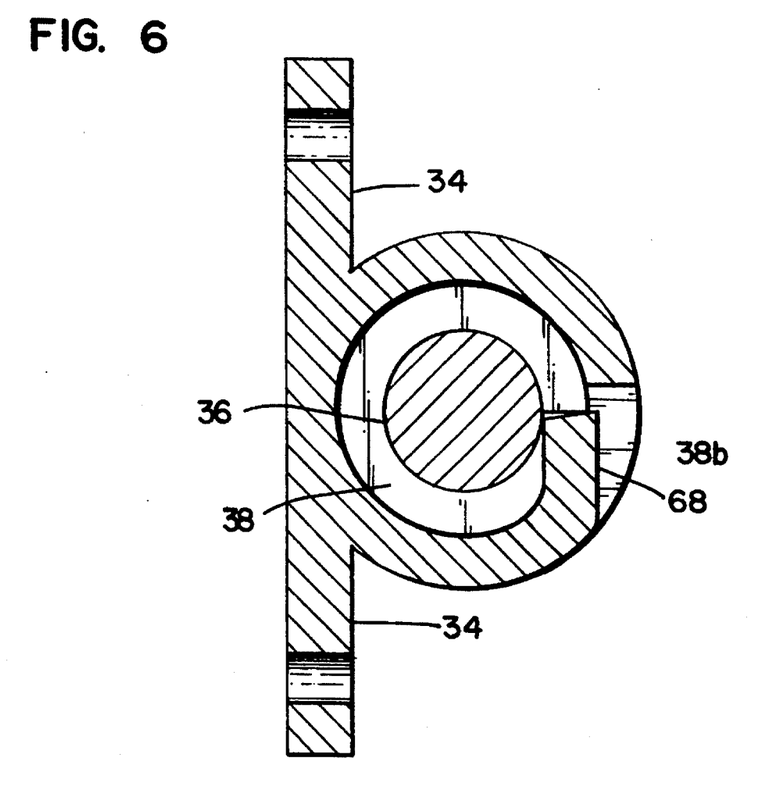
FIG. 6 is an end sectional view of the spring hinge shown in FIG. 5 with the spring and its associated shaft disposed in the housing of the spring hinge.

Referring to FIGS. 4 thru 8, an embodiment of the present invention will now be described in more detail. As illustrated, the housing 32 defines a first opening 60 and a second opening 62 coaxially aligned with each other. The opening 60 is of a larger diameter than the opening 62 which is defined by a flange 64. The housing 32 has a projection 66 on an inner wall of the flange 64. The projection 66 is configured and arranged to abut an end 38a of the spring 38. The housing 32 includes a projection 68 proximate the first opening 60 which is formed by a portion of an outer wall of the housing 32 being forced radially inward. This might be done by use of a conventional punch apparatus. The projection 68 is configured and arranged to abut an opposite end 38b of the spring 38. FIG. 4 illustrates the housing 32 prior to the projection 68 being forced inward and FIG. 6 illustrates the projection 68 having been forced inward. In the preferred embodiment shown, the projection is offset somewhat from the end of the housing 32 so there is a housing wall on either side of the projection 68 so as to provide added structural support for the projection 68. However it will be appreciated that the projection 68 might be located at the very end of the housing 32 such that there is no housing wall on one side of the projection 68.

The housing wall is in very close proximity to the outer periphery of the spring coils. The housing wall cooperates with the end coil wraps to minimize the amount the end coil wraps of the spring lift off the shaft. This minimizes springback and prevents coil deformation when light gauge wire is used.

In the preferred embodiment, the housing might be made of a material which is softer than the spring 38 so it will not accidently deform the spring when it is formed and which can be readily punched or forced to form the projection 68. One composition that might be used is a zinc alloy known as Zamak2 AC43A which is sold by Dynacast Inc. having a place of business in Yorktown Heights, N.Y.

10598-4639. Zamak2 has good strength and ductility such that it can be readily punched to form a specific shape and will compress or deform to form a proper abutment with the end of the spring 38 and will not deform the spring. Moreover, it has good wear characteristics as well. Another example of material that might be used is aluminum. It will be appreciated that the housing might be made of various other materials. For example, the housing 32 might be made of a hardened steel wherein the projection 68 might be predefined or partially preformed in the wall of the housing 32 prior to being punched out or completely formed.

In the preferred embodiment, the projection 68 is tapered as generally illustrated in FIG. 5, such that a distal end 68a of the projection 68 has a greater width. The taper and configuration of the distal end is configured and arranged such that when the projection 68 is formed, a side edge 68b of the projection 68 will generally align and abut against a side wall of a coil of the spring 38 immediately adjacent the projection 68. Thus the projection 68 cooperates with the flange 64 to limit axial movement of the spring 38 along the shaft 36.

Figure 7A:
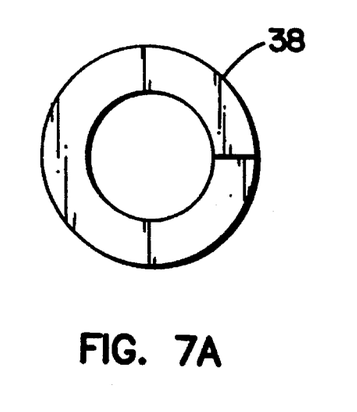
FIG. 7A,B are an end view and elevational view, respectively, of an embodiment of the spring used in the spring hinge of FIG. 5.
Figure 7B:
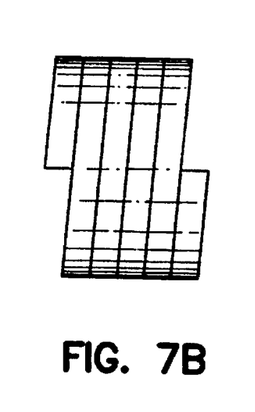

The projections 66 and 68 abut the ends 38a,b of the spring 38, respectively, such that the spring 38 is allowed very little or no angular movement between the projections. The projections are disposed in the path of the coil spring wrap such that no toes or extensions extending out of the path of the coil wrap are required on the spring 38 to engage the projections 66 & 68. Rather the spring 38 is simply cut at its ends with its ends 38a,b lying in the normal coil path of the spring 38. This is best illustrated in FIG. 7, where an end view of the spring is shown. As can be seen, the ends 38a,b are shown as lying in the coil path of the spring coil.

The coils of the spring 38 are completely enclosed by the cylindrical housing 32 so as to shelter the spring from the elements. Once the spring 38 and shaft 36 combination have been inserted into the housing 32 through the housing opening 60, the opening of the housing 32 might be packed with a suitable substance, such as packing grease, so as to further protect the spring 38 from the elements. This will minimize the tendency of the spring itself to rust if the spring hinge is exposed to the elements. To further protect the spring, the projection 68 could be incorporated into an end cap to completely seal the spring.

Figure 8:
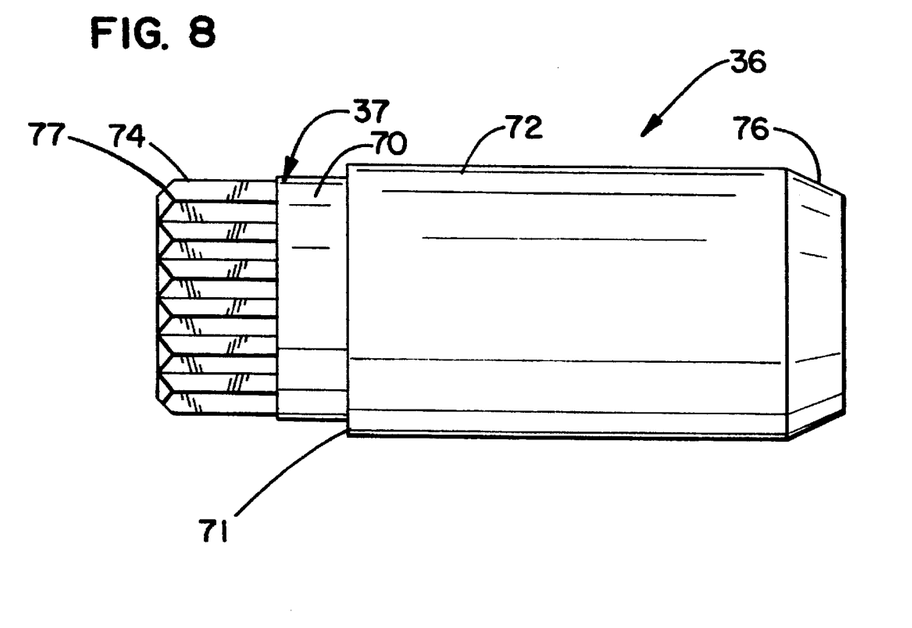
FIG. 8 is an elevational view of the shaft shown in the spring hinge of FIG. 5.

Illustrated in FIG. 8 is an embodiment of the shaft 36. The shaft extension end 37 preferably includes a collar section 70 of lesser diameter than the main body 72 of the shaft 36. A shoulder 71 is formed between the collar section 70 and the main body 72. The collar 70 is configured and arranged to be rotatably supported by the housing opening 62 while the main body 72 is supported by the housing opening 60 at the other end of the shaft 36. The shoulder portion 71 abuts against the housing flange 64 so as to limit axial movement of the shaft 36 in the direction of the shaft extension end 37. The shaft extension end 37 further includes, in the preferred embodiment a knurled or ribbed portion 74. It will be appreciated, the shaft 36 may have other end configurations.

A suitable hinge extension 33 can be press fit onto the knurled portion 74 as illustrated in FIG. 5. When the hinge extension 33 is press fitted onto the shaft extension end 37, axial movement of the shaft 36 in the direction of the housing opening 60 is prevented. Thus axial movement of the shaft 36 is prohibited. Ends 76, 77 of the shaft 36 are tapered to facilitate insertion of the shaft 36 into the spring 38 and insertion of the hinge extension 33 onto the shaft 36.

The spring 38 and shaft 36 are preferably made of steel. In one embodiment, the spring is made from music wire and the shaft is made from case-hardened 12L14 steel. The spring 38 is preferably formed by conventional spring winding methods used to make coil springs.

One method of assembling the preferred embodiment of the spring hinge 30 will now be discussed. The spring 38 is held and the shaft 36 is pressed into it to provide an interference fit with the spring 38. A packing grease is placed in the housing 32 to provide additional protection for the spring 38. The shaft 36/spring 38 combination is then inserted into the housing 32. The shaft 36 is inserted until the shoulder 71 abuts the flange 64 of the housing 32. In the preferred embodiment, the housing 32 has the projection 66 integrally formed on an interior wall of the flange 64 in the housing 32. The housing 32 might be formed along with its bracket 34 by a molding process as a one piece unit. The projection 68, might be predefined in the wall of the housing 32 if a hard material such as steel is used. If a soft material such as a zinc or aluminum composite is used, no preforming of the projection 68 is necessary. The shaft/spring assembly is rotated to engage one end of the spring with the projection 66. Once the shaft 36/spring 38 assembly is in place in the housing 32, the projection 68 is formed by a suitable material deforming process such as by punching out the projection 68. Once the housing 32 has been assembled with its components, the hinge extension 33 is press fitted onto the shaft extension attachment end 37. The hinge 30 is then suitably attached to the structure with which it is to be used by use of suitable fasteners or by other suitable methods.

Figure 9A:
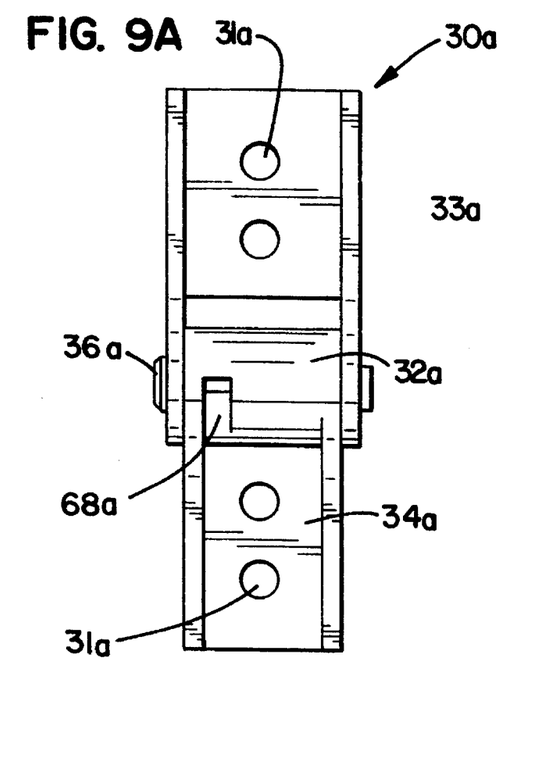
FIG. 9A,B are top and side views, respectively, of an embodiment of a spring hinge assembly in accordance with the principles of the present invention.
Figure 9B:
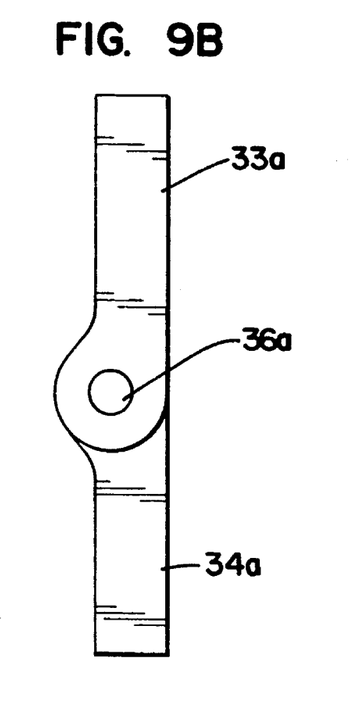

Illustrated in FIGS. 9A,B thru 11A,B are embodiments 30a,b,c of the hinge 30, wherein the hinge housing 32 and hinge extension 33 take on varying configurations and arrangements. In FIGS. 9A,B, the housing 32a and hinge extension 33a form a straight line configuration hinge 30a wherein the hinge extension overlaps the ends of the housing 32a and the shaft 36 is inserted therethrough.

Figure 10A:
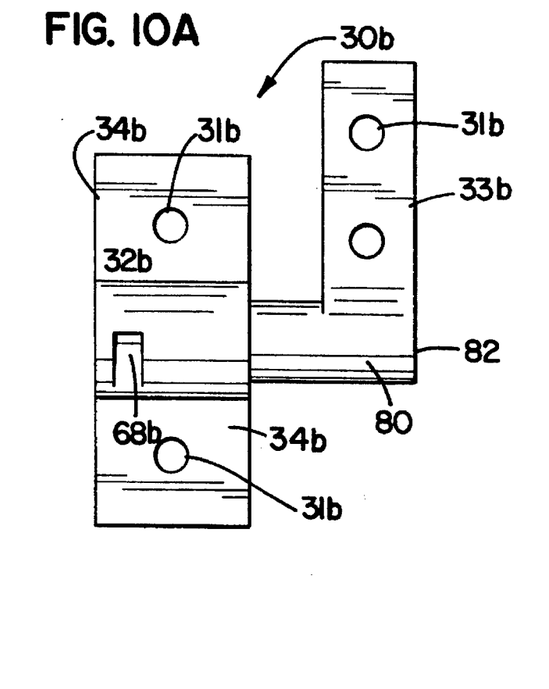
FIG. 10A,B are top and side views, respectively, of an embodiment of a spring hinge assembly in accordance with the principles of the present invention.
Figure 10B:
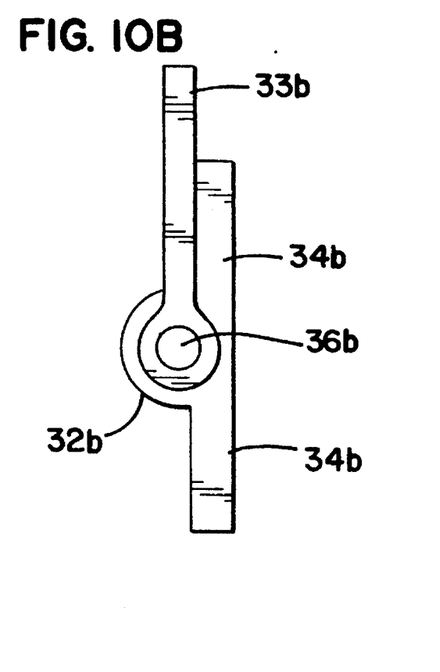

FIGS. 10A,B illustrate a hinge 30b wherein the hinge extension 33b forms a right angle with respect to the housing 32b. The hinge extension 33b might be press fitted onto the shaft of the housing as previously discussed. In this embodiment, the shaft 36b extends along a tubular housing portion 80 of the hinge extension 33b to proximate a sidewall 82 of the hinge extension 33b so as to provide additional structural support for the hinge extension 33b.

Figure 11A:
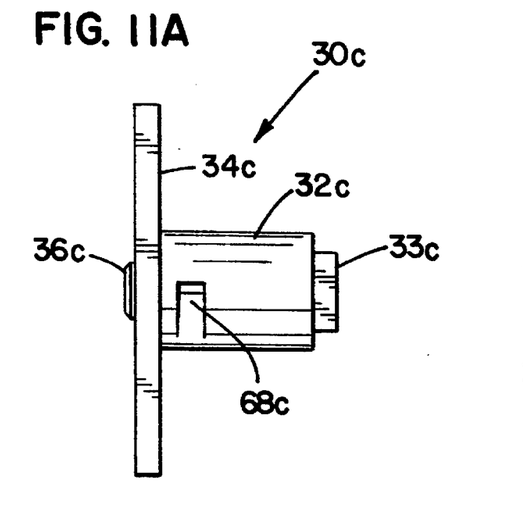
FIG. 11A,B are side and end views, respectively, of an embodiment of a spring hinge assembly in accordance with the principles of the present invention.
Figure 11B:
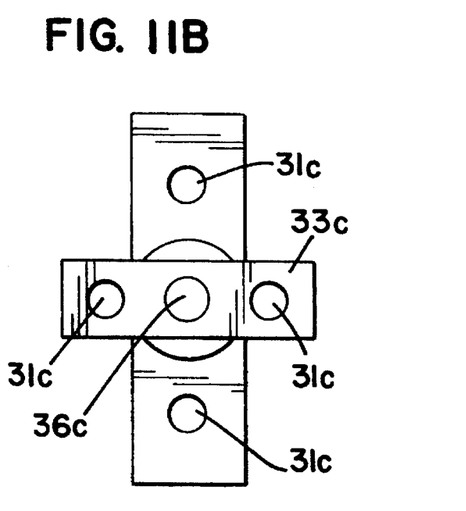

In FIGS. 11A,B, a hinge 30c is shown wherein the bracket 34c is integrally formed with the housing 32c at one end of the housing. A hinge extension 33c is disposed on the shaft 36c proximate the other end of the housing 32c and extends at right angles to the bracket 34c.

As illustrated, the brackets 34a,b,c and hinge extensions 33a,b,c are shown as having apertures 31a,b,c for insertion therethrough of suitable fasteners for fastening the brackets and hinge extensions in place. It will be appreciated that other methods of fastening the hinge 30 might be utilized. For example, the bracket 34 and hinge extension 33 might not contain any apertures but rather be configured for insertion into a suitable cavity in the base structure and/or device to be hinged. Also, the bracket 34 might be offset from the housing axis so as to not extend transversely through the housing axis. Additionally, the bracket 34 need not necessarily be molded or made integral with the housing 32. Various bracket arrangements and extensions might be utilized in keeping with the principles of the present invention.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the claims

What is claimed is:

1. A torque limiting apparatus, comprising:

a coil spring disposed coaxially about a shaft, the coil spring having a smaller inside diameter than the outside diameter of the shaft so as to provide an interference fit with the shaft, the coil spring having a plurality of coils defining a coil wrap path, ends of the coil spring lying in the coil wrap path; and a housing having first and second ends, the housing supporting the spring and shaft, the housing having projections proximate both of the ends of the coil spring, whereby as the shaft is rotated in either direction one of the ends of the spring is engaged by the housing forcing the coil spring to expand into a "wrap open" condition whereby the shaft can rotate relative to the coil spring when a predetermined torque is applied to the shaft.

2. An apparatus in accordance with claim 1, wherein the housing encloses the periphery of the spring coils.

3. An apparatus in accordance with claim 1, wherein one of the housing projections is disposed on an inner, transversely extending wall of a flange of the housing proximate a first end of the housing and abuts a first end of the spring.

4. An apparatus in accordance with claim 1, wherein one of the housing projections is a section of housing wall proximate a second end of the housing which is deformed to extend radially inward to abut a second end of the spring.

5. An apparatus in accordance with claim 1, further including housing means for preventing axial movement of the spring.

6. An apparatus in accordance with claim 1, wherein a first end of the housing defines an opening of a lesser diameter than an opening in a second end of the housing, the shaft having a shaft extension end with a reduced diameter collar portion being received and rotatably supported in the opening of the first end of the housing, a body section of the shaft being of larger diameter than the collar portion and being rotatably supported in the opening of the second end of the housing.

7. An apparatus in accordance with claim 1, wherein the shaft extension end includes an extension attachment portion projecting beyond the first end of the housing, the extension attachment portion being configured and arranged for attachment to an extension.

8. An apparatus in accordance with claim 7, further including an extension attached to the extension attachment portion of the shaft.

9. An apparatus in accordance with claim 8, wherein the extension is press fitted onto the extension attachment portion of the shaft.

10. An apparatus in accordance with claim 7, wherein the extension attachment portion includes a knurled portion.

11. An apparatus in accordance with claim 1 further including a bracket means for attachment of the housing to a base structure and an extension attached to an extension attachment portion of the shaft projecting from the housing, the extension including means for attachment to a device so as to provide the device with angular movement relative to the base structure.

12. An apparatus in accordance with claim 11, wherein the bracket means is integrally formed of one piece with the housing.

13. An apparatus in accordance with claim 11, wherein the extension defines apertures configured for receipt of suitable fasteners.

14. A torque limiting apparatus, comprising:

a coil spring disposed coaxially about a shaft, the coil spring having a smaller inside diameter than the outside diameter of the shaft so as to provide an interference fit with the shaft, the coil spring having a plurality of coils defining a coil wrap path, ends of the coil spring lying in the coil wrap path; and a housing supporting the spring and shaft and enclosing the end coils of the spring, the housing having projection means proximate both the ends of the coil spring for engaging one of the ends of the spring upon rotation of the spring in either direction and forcing the coil spring to expand into a "wrap open" condition whereby the shaft can rotate relative to the coil spring when a predetermined torque is applied to the shaft.

15. An apparatus in accordance with claim 14, wherein the housing encloses all the coils of the spring.

16. An apparatus in accordance with claim 14, wherein the housing includes means for limiting axial movement of the spring.

17. An apparatus in accordance with claim 14, wherein at least one of the means for engaging the spring includes a portion of the housing which is deformed to extend radially inward.

18. A spring hinge apparatus, comprising:

a coil spring disposed coaxially about a shaft, the coil spring having a smaller inside diameter than the outside diameter of the shaft so as to provide an interference fit with the shaft, the coil spring having a plurality of coils defining a coil wrap path, ends of the coil spring lying in the coil wrap path;

a housing supporting the spring and shaft and encircling the coils of the spring, the housing having projections proximate both of the ends of the coil spring, whereby as the shaft is rotated in either direction one of the ends of the spring is engaged by the housing forcing the coil spring, to expand into a "wrap open" condition whereby the shaft can rotate relative to the coil spring when a predetermined torque is applied to the shaft, the housing including bracket means for attachment of the housing to a base structure; and a hinge extension attached to a hinge extension attachment portion of the shaft projecting from the housing, the hinge extension including means for attachment to a device so as to provide the device with angular movement relative to the base structure.

19. An apparatus in accordance with claim 18, wherein the bracket means is integrally formed of one piece with the housing.

20. An apparatus in accordance with claim 18, the hinge extension defining apertures configured for receipt of suitable fasteners.

21. A torque limiting apparatus, comprising:

a coil spring disposed coaxially about a shaft, the coil spring having a smaller inside diameter than the outside diameter of the shaft so as to provide an interference fit with the shaft, the coil spring having a plurality of coils defining a coil wrap path, ends of the coil spring lying in the coil spring path; and spring stop means projecting into the coil wrap path adjacent the ends of the coil spring for engaging one of the ends of the coil spring upon rotation of the shaft in either direction so as to force the coil spring to expand into a "wrap open" condition whereby the shaft can rotate relative to the coil spring when a predetermined torque is applied to the shaft, the spring stop means being adjustable relative to the ends of the spring so as to closely abut the ends of the spring.

22. A torque limiting apparatus in accordance with claim 21, further including means for enclosing the end coils of the spring.

23. A torque limiting apparatus, comprising:

a coil spring disposed coaxially about a shaft, the coil spring having a smaller inside diameter than the outside diameter of the shaft so as to provide an interference fit with the shaft, the coil spring having a plurality of coils defining a coil wrap path, ends of the coil spring lying in the coil wrap path; and a housing supporting the spring and shaft, the housing having projections proximate both of the ends of the coil spring, whereby as the shaft is rotated one of the ends of the spring is engaged by the housing forcing the coil spring to expand into a "wrap open" condition whereby the shaft can rotate relative to the coil spring when a predetermined torque is applied to the shaft, one of the housing projections being a section of housing wall proximate a second end of the housing which is deformed to extend radially inward to abut a second end of the spring.

24. A torque limiting apparatus in accordance with claim 23, wherein the housing encloses the end coils of the spring.

25. A torque limiting apparatus, comprising:

a coil spring disposed coaxially about a shaft, the coil spring having a smaller inside diameter than the outside diameter of the shaft so as to provide an interference fit with the shaft, the coil spring having a plurality of coils defining a coil wrap path, ends of the coil spring lying in the coil wrap path; and a housing supporting the spring and shaft, the housing having projections proximate both of the ends of the coil spring, whereby as the shaft is rotated one of the ends of the spring is engaged by the housing forcing the coil spring to expand into a "wrap open" condition whereby the shaft can rotate relative to the coil spring when a predetermined torque is applied to the shaft, a first end of the housing defining an opening of a lesser diameter than an opening in a second end of the housing, the shaft having a shaft extension end with a reduced diameter collar portion being received and rotatably supported in the opening of the first end of the housing, a body section of the shaft being of larger diameter than the collar portion and being rotatably supported in the opening of the second end of the housing.

* * * * *